United States Patent [19]
Skelton

[11] Patent Number: 5,088,754
[45] Date of Patent: Feb. 18, 1992

[54] SIDE FOLDING FRONT TOW BAR

[76] Inventor: Harold M. Skelton, 16814 Hwy 160, Rio Vista, Calif. 94571

[21] Appl. No.: 646,236

[22] Filed: Jan. 28, 1991

[51] Int. Cl.⁵ .......................... B60D 1/52; B60D 1/167
[52] U.S. Cl. ............................... 280/491.3; 280/491.1
[58] Field of Search ............... 280/491.1, 491.3, 491.4, 280/494, 493, 480.1, 292

[56]  References Cited

U.S. PATENT DOCUMENTS

| | | | |
|---|---|---|---|
| 3,287,027 | 11/1966 | Schuckman | 280/491.3 |
| 3,410,579 | 11/1968 | Jenson | 280/491.3 |
| 3,419,285 | 12/1968 | Morehouse et al. | 280/491.4 X |
| 4,273,352 | 6/1981 | Jorgenson | 280/491.3 X |
| 4,420,169 | 12/1983 | Taylor | 280/494 X |
| 4,509,769 | 4/1985 | Weber | 280/491.1 |
| 4,768,803 | 9/1988 | Hewitt et al. | 280/511 X |
| 4,856,805 | 8/1989 | Davis | 280/491.4 |
| 5,000,473 | 3/1991 | Johnson | 280/491.1 |

FOREIGN PATENT DOCUMENTS 866085  3/1971  Canada ............................ 280/491.3

Primary Examiner—Charles A. Marmor
Assistant Examiner—Kevin Hurley
Attorney, Agent, or Firm—William S. Bernheim

[57]  ABSTRACT

An apparatus for towing one motor vehicle behind another is attached to the front end of the vehicle to be towed. When not in use, the apparatus can be folded sideways while still attached to the vehicle, so as not to obstruct the driver's vision.

3 Claims, 3 Drawing Sheets

SIDE FOLDING FRONT TOW BAR

BACKGROUND OF THE INVENTION

1. Field of the Invention

The present invention relates to tow bars attached to the front of vehicles to be towed.

2. Description of the Prior Art

There are numerous tow bars for allowing one vehicle to tow a second. The typical tow bar attaches to the front of the towed vehicle at two points spaced apart and equally from the centerline of the towed vehicles. Tow bars have various drawbacks. Some must be removed before the towed vehicle can be driven safely. Some are too heavy to be left in place when not in use. Some are too flimsy to last or raise safety questions.

Tow bars typically extend 3 feet forward of the vehicle to allow clearance for hooking up and to allow the joined vehicles to negotiate turns and backup. This extension must be removed before the towed vehicle is used independently. If not removed, the extended portion could hit the ground or an object in the roadway and cause an accident. Further, the extended portion interferes with parking and can be tripped over.

Removal of the tow bar from the front of the vehicle is not a complete answer. Tow bars are normally unwieldy and weigh over 42 pounds which makes removal difficult for anyone not in good shape or having physical limitations. Once removed, storage and having the vehicle and tow bar at the right location together can present problems.

There are tow bars which are tiltable vertically and some allow the tow bar to exceed 90° and be tilted back against the front of the vehicle. This can serve as a short distance solution but the extension is a dangerous visual obstruction to the driver.

STATEMENT OF THE OBJECTS

Accordingly, it is a primary object of this invention to provide a tow bar which can remain fixed to the front of a towed vehicle and which, when not in use, can be safely folded in a manner not obstructing the vision of the driver.

Other objects, advantages and novel features of the invention will become apparent to those skilled in the art upon examination of the invention and the accompanying drawings.

SUMMARY OF THE INVENTION

BRIEF DESCRIPTION OF THE DRAWINGS

Further objectives and advantages of the invention will be apparent from the following detailed description, taken in conjunction with the accompanying drawings illustrating a preferred embodiment of the invention. The drawings are.

DETAILED DESCRIPTION OF A PREFERRED EMBODIMENT

Frequently one vehicle is used to tow a second vehicle. During such a tow the second vehicle needs to trail adequately. For this purpose the second vehicle must be restrained so that the second vehicle does not move too freely side to side and does not roll forward and strike the front vehicle when the first vehicle is slowed. Tow bars can be used for this purpose. A typical tow bar assembly uses a triangular configuration to limit sideward movement and to maintain the spacing between the vehicles. The assembly attaches at one point, the center of the rear of the towing vehicle and at two points equal distance on opposite sides of the center of the front of the towed vehicle. The tow bar assembly has a centerline defined as perpendicular to the front of the second vehicle and centered on the front to pass through the apex of the triangular configuration.

Figure 1:
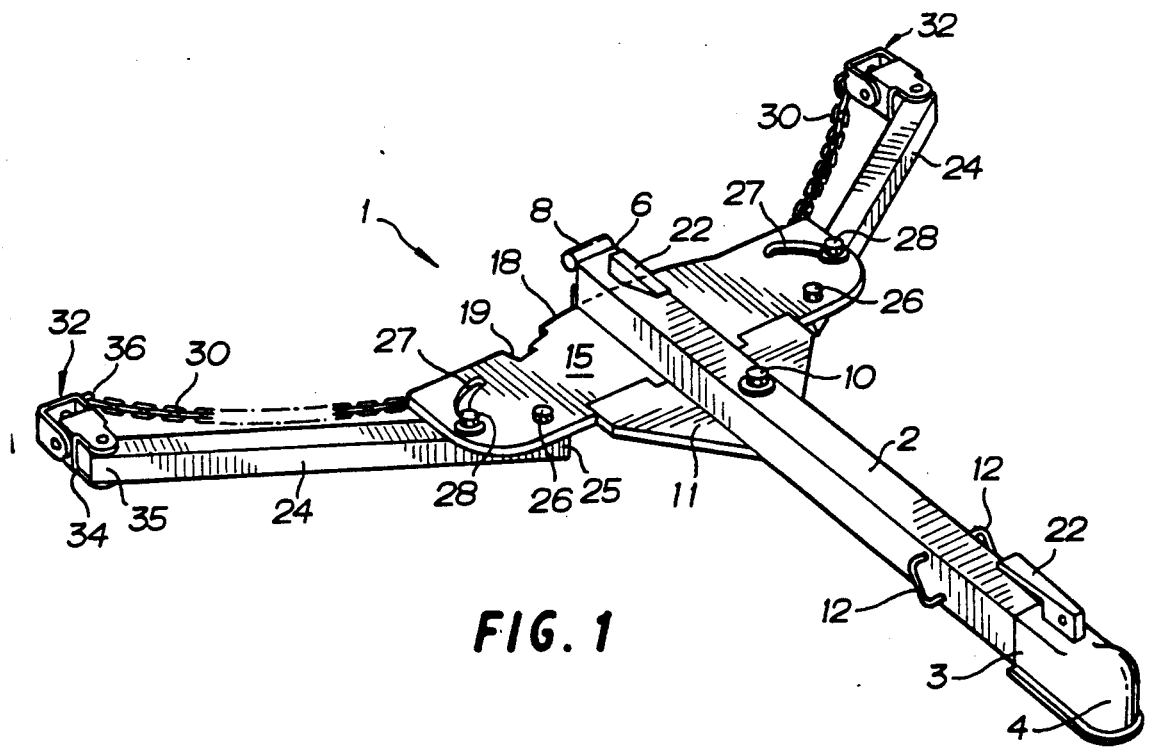
FIG. 1 is a prospective view of a tow bar in the operable mode according to the invention.
Figure 2:
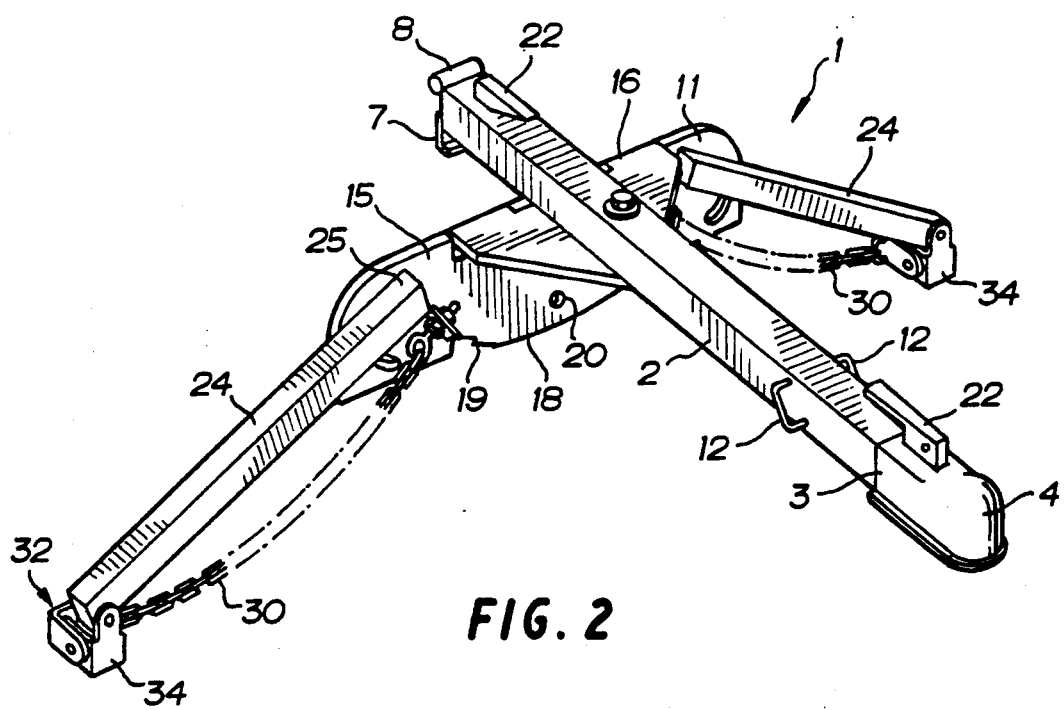
FIG. 2 is a prospective view of the tow bar of FIG. 1 in a partially broken open mode.
Figure 3:
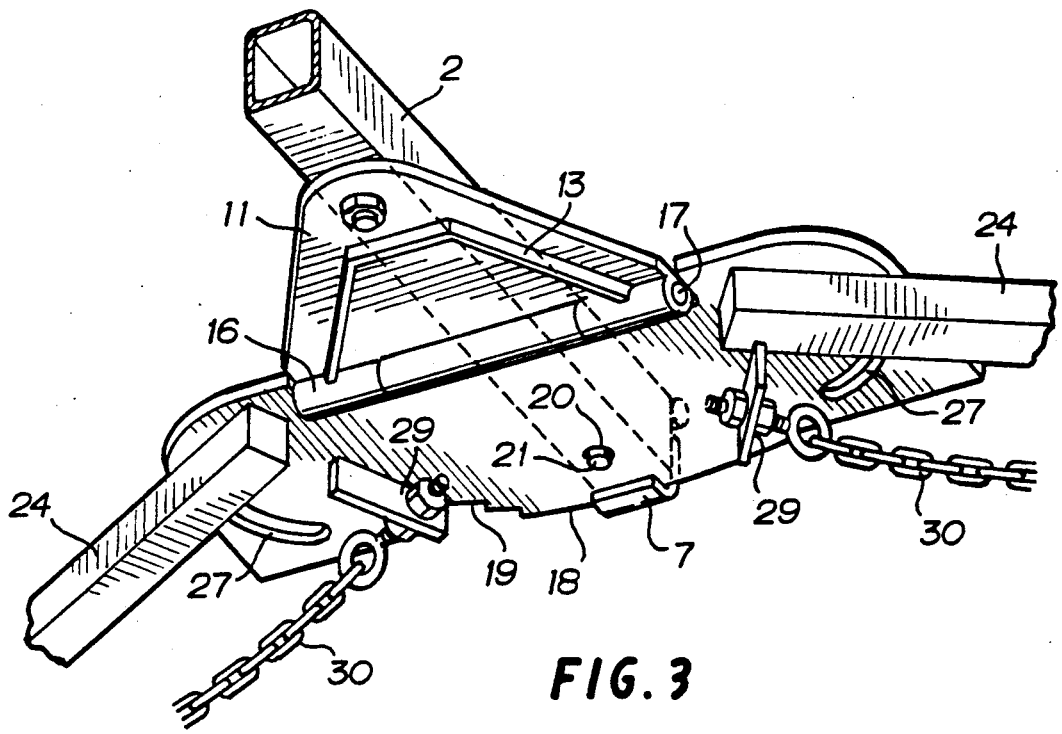
FIG. 3 is a partial prospective bottom view of FIG. 1.
Figure 4:
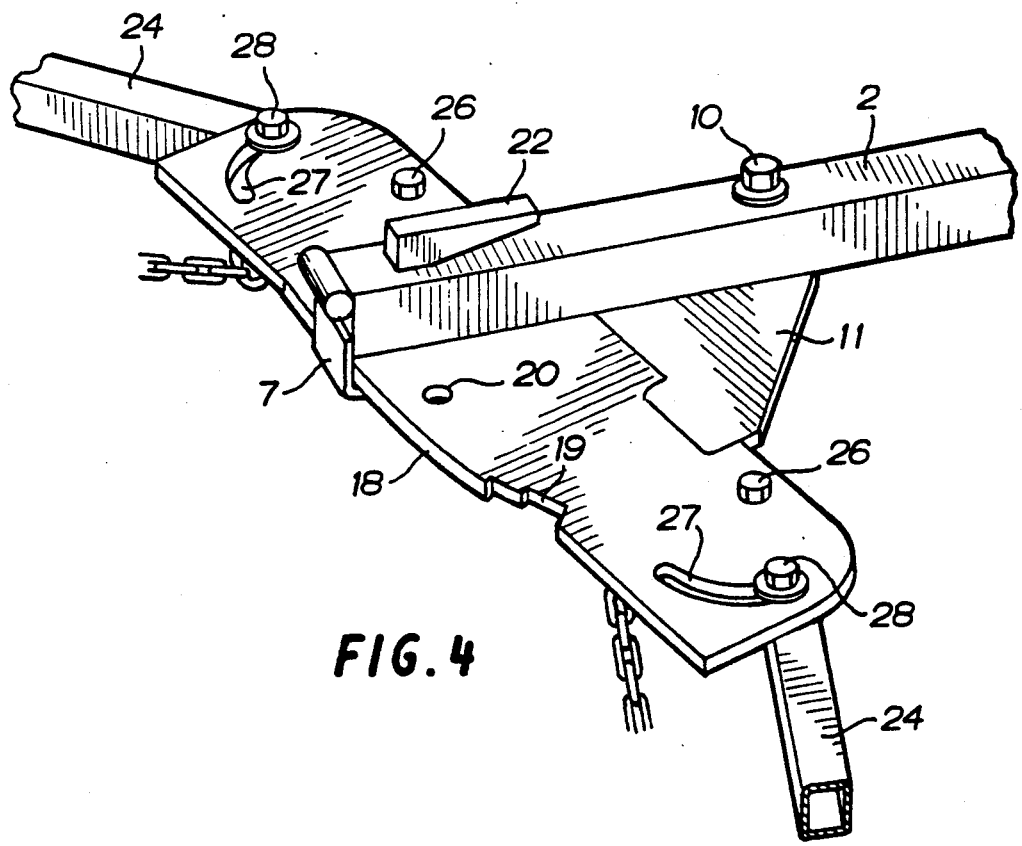
FIG. 4 is a prospective view of the tow bar of FIG. 1 in a partially broken open mode.
Figure 5:
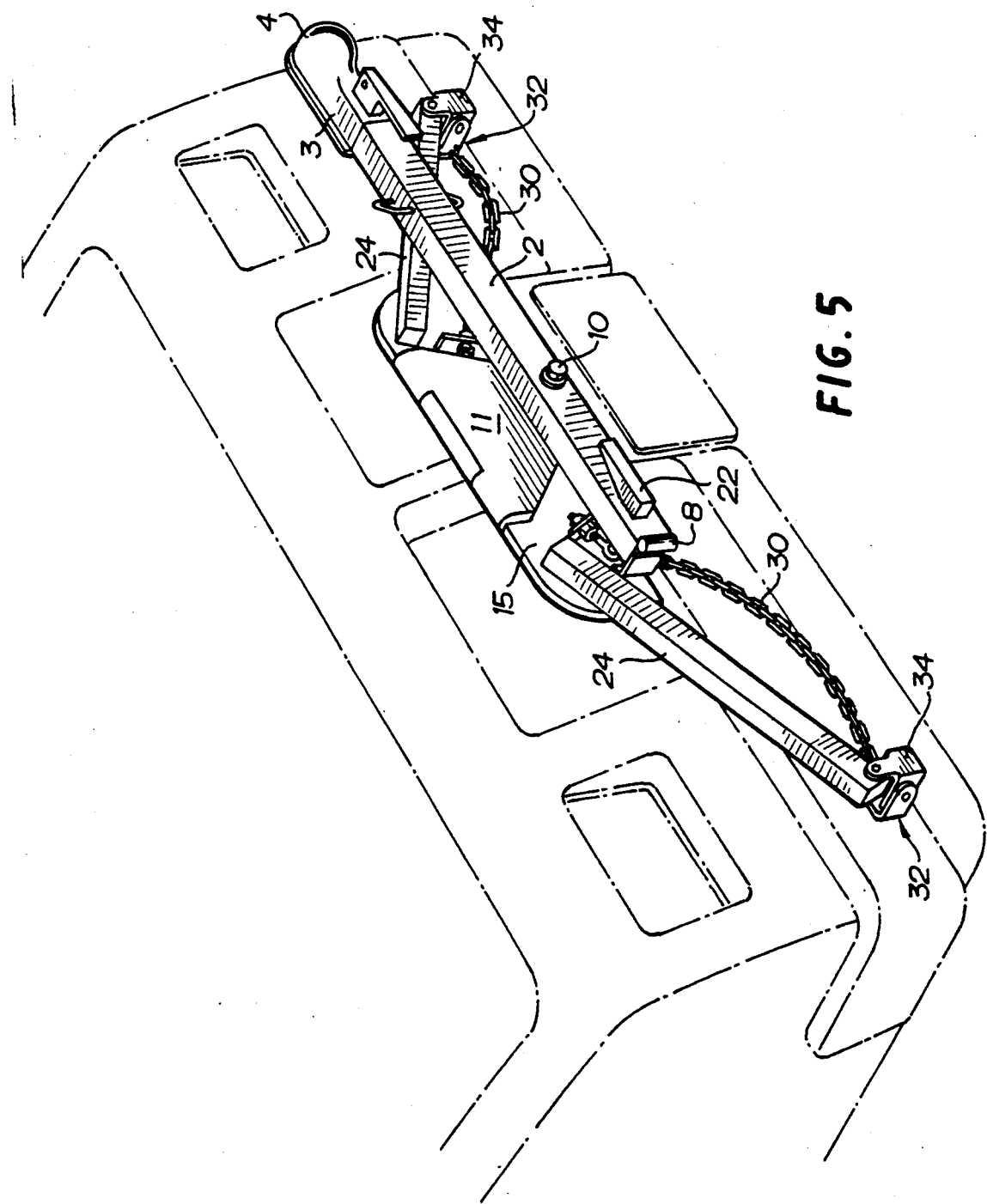
FIG. 5 is a partial prospective view of the tow bar assembly in the stowed mode.

The tow bar assembly 1 as shown in FIG. 1 includes a rectangular tubing member 2 adapted at a first leading end 3 to detachably couple 4 with a draft hitch which is mounted at the rear of the towing vehicle and adapted at the opposite trailing end 6 to have a knuckle 7 as shown in FIG. 3 and a grip 8 for handling purposes. A commerically available hitch and ball is suitable.

The tubing member 2 has a rotating means 10 for rotatable attachment to a forward plate 11 to rotate between a tow position, a slot position and a stow position. In the tow position the tubing member 2 is rotated to be positioned along the centerline of the tow bar assembly 1. In more detail, a bolt 10 is passed through the tubing member 2 approximately 12 inches along the tubing member 2 from the knuckle 7 and in turn passed through the forward plate 11. The bolt 10 serves as a pivot point for the rotation between the three positions.

Also found along the tubing member 2 are two metal loops 12 on opposite sides of the tubing member 2. For safety, a chain is connected between the towed vehicle and towing vehicle as a secondary means to hold the vehicles together should the tow bar assembly fail 1. The safety chain is threaded through one of the loops 12 to keep the chain from dragging on the ground. The forward plate 11 has a rib 13 for added structural strength.

The forward plate 11 has a hinge means 16 for hingedly mounting the forward plate 11 to a base plate 15. A one inch pivot pin 17 which is fastened into position is recommended. The forward plate 11 and base plate 15 each define a plane which can be rotated to define a single plane. The degree of rotation approaches 180°. The base plate 15 has a curved perimeter 18 equal distance from the pivot point of the tubing member 2 when the plates 11 and 15 define a single plane. Along the curved perimeter 18 is a slot 19 to receive or release the knuckle 7 when the tubing member is rotated to the slot position and the forward plate 11 and base plate 15 are rotated into the single plane or rotated out of the single plane.

The curved perimeter 18 should extend on both sides of the centerline to allow easier coupling of the couple 4 onto the draft hitch by making the assembly 1 self centering. With a conventional rig, both the alignment and spacing between the tow and towed vehicle is critical when hitching them up. Two persons are needed to attach them together, one to drive the tow vehicle and a second between the vehicles to instruct and drop the couple 4 on to the draft hitch. The rotation of the knuckle along the curved perimeter shortens the length of the tow assembly 1 and by allowing rotation in either direction allows the hitch to be placed on the ball with 5 to 7 inches of leeway in the spacing between the vehicles and 4 or 5 inches of leeway in the alignment. In most cases the vehicles can be joined without the need of a second person between the vehicles. Once placed, the tow vehicle is moved forward causing the tubing member 2 to straighten and lock into position as described further hereafter.

The slot 19 is about 1½ inches wide and ¾ inches in depth. The knuckle 7 curling around the curved perimeter 18 of the base plate 15 locks the forward plate 11 and base plate 15 into the single plane. The slot 19 is offset from the centerline of the tow bar assembly about 45°.

The base plate 15 has a locking hole 20. The locking hole 20 is on the centerline of the tow bar assembly 1 and works cooperatively with a spring loaded pin 21 attached to the tubing member 2. When the knuckle 7 is locked to the base plate 15 and the tubing member 2 is rotated to the centerline position, the pin 21 slides downward into the locking hole 20 to prevent further rotation of the tubing member 2 relative to the forward plate 11 until the pin 21 is removed from the locking hole 20. A 1 inch diameter pin 21 is recommended. The pin 21 is released by applying downward pressure on a lever 22.

Two draft arms 24 are each attached at one end 25 to the base plate 15 equal distance from the centerline. Preferably to allow better adaptability the attachment is with a bolt 26 which allows flexibility in the angle between the centerline and the draft arm 24. A curved guide 27 is formed in the base plate 15 for each draft arm 24 to accept a second bolt 28 also connecting each draft arm 24 to the base plate 15. The base plate 15 also has means 29 for attaching a secondary chain 30 to the base plate 15 to parallel the draft arm 24.

Two bumper mounts 32 are mounted to the front of the towing vehicle equal distance from the centerline of the towing vehicle. With a U-joint 34 the opposing end 35 of each draft arm 24 is adapted to rotatably mount to one of the bumper mounts 32. The bumper mounts 32 also have means 36 by which the secondary chain 30 is attached and by which by adjusting the length of the chain 30 at the first end 25 a portion of the tow load is transferred from the draft arms 24 to the chain 30.

It is intended that the tow bar assembly can be left mounted on the towed vehicle for extended periods while not being used. In this stowed position the draft arms 24 are rotated into a vertical plane. The tubing member 2 is not locked to the base plate 15 and has been rotated to be perpendicular to the centerline. The base plate 15 is in a vertical plane and the forward plate 11 has been rotated away from the single plane almost into the vertical plane. Various methods can be used to assure that once stowed the assembly will not unfold. A cotter type pin or chain can be used. In this stowed position the driver view is not obstructed. To move from the stowed position to the tow position, the retaining chain is removed and the tubing member 2 is rotated forward and downward to an intermediate position. The rotation of the tubing member 2 is to the slot position so that when the plates 11 and 15 rotate to the single plane the knuckle 7 can engage the base plate 15. From the intermediate position the tubing member 2 is rotated to the towing position with the knuckle 7 curled around the perimeter of the base plate 15 and the locking pin 21 engages the locking hole 20. To return to the stowed position the procedure is reversed with the first step using the lever 22 to release the locking pin 21 so that the tubing member 2 can be rotated.

I claim:

1. A tow bar assembly adapted to be attached to the front portion of a towed vehicle for towing by a vehicle having a draft hitch member comprising:
   a. a tubing member adapted at a first leading end to detachably couple with said draft hitch in a tow position and having a knuckle at the opposite trailing end;
   b. the tubing member having a rotating means for rotatable attachment to a forward plate to rotate between a tow position, a slot position and a stow position;
   c. the forward plate being hinged to a base plate;
   d. the base plate having a curved perimeter having a slot therein for receiving the knuckle when the member is in a lock position relative to the forward plate;
   e. a hole in the base plate;
   f. a pin as part of the tubing member to move into the hole when the tubing member is in the tow position relative to the forward plate; and
   g. two draft arms each attached at one end to the bumper of the towed vehicle and the respective opposite end of each draft arm attached to the base plate.

2. The tow bar assembly of claim 1 wherein the knuckle moves in cooperation with the curved perimeter of the base plate to lock the forward plate and base plate in a single plane relative to each other.

3. The tow bar assembly of claim 2 wherein the curved perimeter of the base plate extends to both sides of the lock position of the tube member.

* * * * *